(12) United States Patent
Nguyen et al.

(10) Patent No.: US 7,269,605 B1
(45) Date of Patent: Sep. 11, 2007

(54) PERSONAL INFORMATION MANAGER DATA SYNCHRONIZATION AND AUGMENTATION

(75) Inventors: Tim D. Nguyen, Newcastle, WA (US); James H. Wong, Seattle, WA (US)

(73) Assignee: Avidian Technologies, Seattle, WA (US)

( * ) Notice: Subject to any disclaimer, the term of this patent is extended or adjusted under 35 U.S.C. 154(b) by 456 days.

(21) Appl. No.: 10/778,911

(22) Filed: Feb. 13, 2004

(51) Int. Cl.
*G06F 17/30* (2006.01)

(52) U.S. Cl. .................. 707/200; 707/203; 707/201

(58) Field of Classification Search ............... 707/203, 707/201; 713/193; 715/500.1
See application file for complete search history.

(56) References Cited

U.S. PATENT DOCUMENTS

| | | | |
|---|---|---|---|
| 6,269,369 B1 * | 7/2001 | Robertson | 707/10 |
| 6,295,541 B1 * | 9/2001 | Bodnar et al. | 707/203 |
| 6,748,402 B1 * | 6/2004 | Reeves et al. | 707/201 |
| 2004/0052356 A1 * | 3/2004 | McKinzie et al. | 379/355.02 |
| 2004/0064514 A1 * | 4/2004 | Daniell et al. | 709/206 |
| 2004/0093317 A1 * | 5/2004 | Swan | 707/1 |
| 2004/0177086 A1 * | 9/2004 | Florkey et al. | 707/102 |
| 2004/0193731 A1 * | 9/2004 | Mitchell | 709/246 |
| 2004/0199779 A1 * | 10/2004 | Huang | 713/193 |
| 2005/0005233 A1 * | 1/2005 | Kays et al. | 715/500.1 |

OTHER PUBLICATIONS

Microsoft Outlook 20023/2002 Add-in: Personal Folders (http://www.microsoft.com/downloads/detail.aspx?displaylang=en&familyid=8B081F3A-B7D0-4B16-B8AF-5A6322F4FD01.*

* cited by examiner

*Primary Examiner*—Jean M. Corrielus
(74) *Attorney, Agent, or Firm*—Perkins Coie LLP

(57) ABSTRACT

A facility for enhancing the information available for contact entry stored by a personal information manager ("PIM") is described. After the PIM is installed, the facility installs an enhanced contact manager program ("ECM") as an add-in module to the personal information manager. The first time after the ECM is executed, the facility copies contact entries stored by the PIM to a data store maintained by the ECM. Each time the ECM is executed, for each contact entry stored by the PIM that was opened since the previous time the ECM was executed, the facility recopies the contact entry to the data store maintained by the ECM. Each time a contact entry is copied or re-copied to the data store maintained by the ECM, the facility both (1) creates a company entry for the company identified by fields of the copied or re-copied contact entry if no company entry exists for this company, and (2) creates an association between the copied or re-copied contact entry and the company identified by fields of the copied or re-copied contact entry.

4 Claims, 15 Drawing Sheets

| contact identifier | First Name | Last Name | ... |
|---|---|---|---|
| 19256423 | James | Wong | |
| 24638221 | Tim | Nguyen | |
| 03796229 | Tim | N-Home | | contact table — 1300
1301, 1302, 1303
1311, 1312, 1313, 1314

| company identifier | company name | company table 1400 |
|---|---|---|
| 7a 46a 29a-e | Avidian Technologies | • • • |
| 1411 | 1412 | 1413 |

*FIG. 14*

| contact/company association table | |
|---|---|
| contact identifier | company identifier |
| 19256423 | 7a 46a 29a-e |
| 24638221 | 7a 46a 29a-e |
| 03796229 | 7a 46a 29a-e |

PERSONAL INFORMATION MANAGER DATA SYNCHRONIZATION AND AUGMENTATION

TECHNICAL FIELD

The present invention is directed to the field of data conversion, input, and export.

BACKGROUND

As the volume of electronic mail sent and received by computer users increases, the amount of time those computer users spend using programs for sending and receiving electronic mail messages ("email clients") also increases. This increase in the use of email clients has created an incentive for providers of email clients to add additional functionality to email clients. As one example, some providers of email clients have added to their email clients functionality for managing contact information and schedule information, transforming them into programs sometimes referred to as personal information managers ("PIMs").

Because PIMs provide more functionality than simpler email clients, they are often used for even greater periods of time than email clients. Additionally, PIMs maintain an even greater body of information relating to their users than do simpler email clients. These differences create an even greater incentive to expand PIMs to include even more functionality, especially additional functionality that is related to the PIM's existing functionality and makes use of or builds on the data already maintained by the PIM.

While it is relatively straightforward for the provider of a PIM to add additional functionality to that PIM, there are often significant obstacles inhibiting third-party providers from adding additional functionality to a PIM, even in cases where the provider of the PIM ostensibly provides add-on support to such third-party providers. In particular, such PIMs typically lack support for adding additional kinds of data to the data stored by the PIMs, and typically lack support for adding functionality to receive, display, edit, or otherwise process additional kinds of data within the PIM. Accordingly, a third party add-on must often separately maintain its own data, synchronize the data it separately maintains with the data maintained "natively" by the PIM, and coordinate its activities with the PIM rather than being able to modify the data storage and processing performed natively by the PIM.

In view of the foregoing, successful approaches for coordinating the activity of a PIM with a third-party add-in and synchronizing shared data between a PIM and a third-party PIM add-in would have significant utility.

BRIEF DESCRIPTION OF THE DRAWINGS

FIG. 2 is a display diagram showing a typical display of contact information in a PIM.

FIG. 12 is a display diagram showing the facility displaying additional information about a company entry, and enabling a user to modify that company entry.

FIG. 13 is a data structure diagram showing partial sample contents of a contact table maintained by the facility.

FIG. 14 is a data structure diagram showing partial sample contents of the company table maintained by the facility.

FIG. 15 is a data structure diagram showing partial sample contents of the contact/company association table maintained by the facility.

DETAILED DESCRIPTION

A software facility ("the facility") adding additional functionality to a personal information manager program ("PIM") by a party other than the provider of the PIM is described. In some embodiments, the additional functionality is added to the Outlook PIM provided by Microsoft Corporation of Redmond, Wash. In some embodiments, the additional functionality added by the facility includes aspects of customer relationship management ("CRM") functionality.

In particular, in some embodiments, the additional functionality added by the facility includes (1) synchronizing contact information maintained by the PIM with contact and related information separately maintained by a PIM add-in, such as an Enhanced Contacts Manager ("ECM") and/or (2) from the synchronized contact data objects representing people, automatically creating new company data objects under the control of the ECM that represent companies employing those people, under which the contact data objects can be segregated.

In some embodiments, the facility transfers all contact information from the PIM to the ECM the first time the add-in is executed, enabling the ECM to use all of the contact information inputted into the PIM since the PIM was installed, and at any later time specified by the user. In some embodiments, the facility selectively synchronizes the contact information that may have been modified by the PIM each time the ECM is executed. By synchronizing contact information maintained by the PIM with contact and related information separately maintained by the PIM ECM, the facility enables the ECM to process up-to-date contact information outside the constraints of the PIM, such as to automatically identify companies for which to create company data objects. Also, by directing the user to use the PIM to create or alter any information supported by the PIM, the facility obviates the need to synchronize changes to contact information made in the ECM to the PIM.

By automatically creating new company data objects representing companies employing people identified by contact data objects, the facility enables users to easily determine which contacts are employed by which companies, and easily store company-specific information, such as the identity of sales representatives assigned to service particular companies, in the company data object and in conjunction with the contact data objects for each of the contacts who are employees of the company. The facility further creates a relationship between multiple contacts data objects representing people that all work for the same company and the company data object representing that company, facilitating the display of all of the contacts associated with the company when the company is displayed. In some embodiments, the facility further prevents the creation of duplicate company data objects for the same company.

Figure 1:
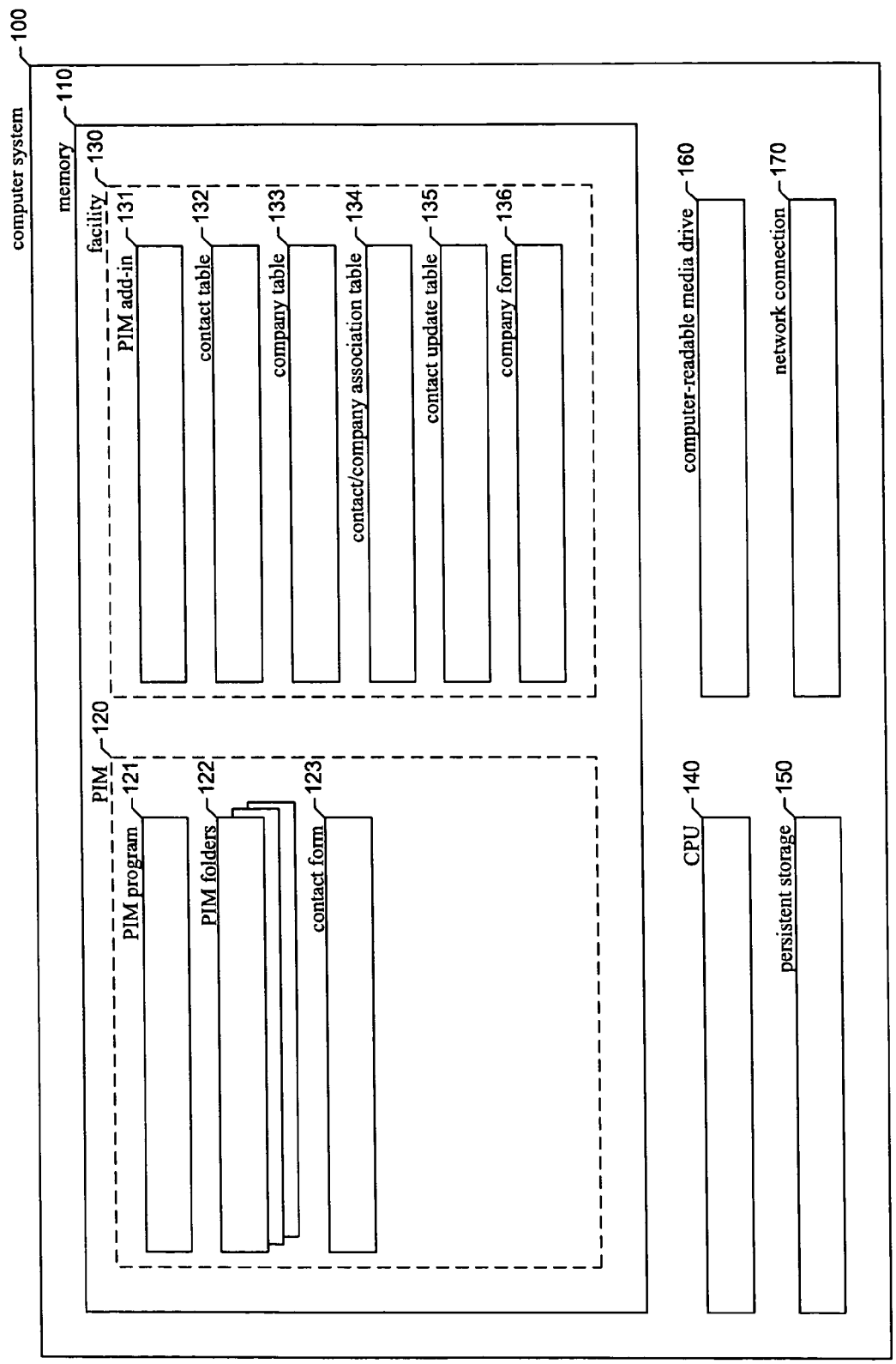
FIG. 1 is a block diagram showing some of the components typically incorporated in at least some of the computer systems and other devices on which the facility executes.

FIG. 1 is a block diagram showing some of the components typically incorporated in at least some of the computer systems and other devices on which the facility executes. The computer system 100 includes a memory 110 for storing programs and data—including data structures—while they are being used; one or more central processing units ("CPUs") 140 for executing computer programs; a persistent storage device 150, such as a hard disk drive, for persistently storing programs and data; a computer-readable media drive 160, such as a CD-ROM drive, for reading programs and data stored on a computer-readable medium; and a network connection 170 for connecting the computer system to other computer systems to exchange programs and/or data, including data structures.

The contents of memory 110 include contents 120 making up the PIM, as well as contents 130 making up the facility. Contents 120 making up the PIM include a PIM program 121, such as the Outlook PIM from Microsoft Corporation of Redmond, Wash.; folders 122 used by the PIM to store items of various kinds, including contact items; and a contact form 123 used by the PIM to input, display, or change the contents of a contact item. Contents 130 making up the facility include a PIM add-in program 131, such as Prophet from Avidian Technologies, Inc. of Bellevue, Wash.; a contact table 132 for storing contact information synchronized from the PIM folders 122, a company table 133 for storing information about companies discerned by the facility from the synchronized contact information; a contact/company association table 134 for storing associations between contacts and companies; a contact update table 135 identifying contacts whose contents may have been changed using the PIM, which are to be re-synchronized; and a company form 136 for inputting, displaying, or changing information for company items. While items 120-136 are preferably stored in memory while being used, those skilled in the art will appreciate that these items—or portions of them—may be transferred between memory and the persistent storage device for purposes of memory management and maintaining data integrity.

While computer systems configured as described above are typically used to support the operation of the facility, one of ordinary skill in the art will appreciate that the facility may be implemented using devices of various types and configurations, and having various components.

Figure 2:
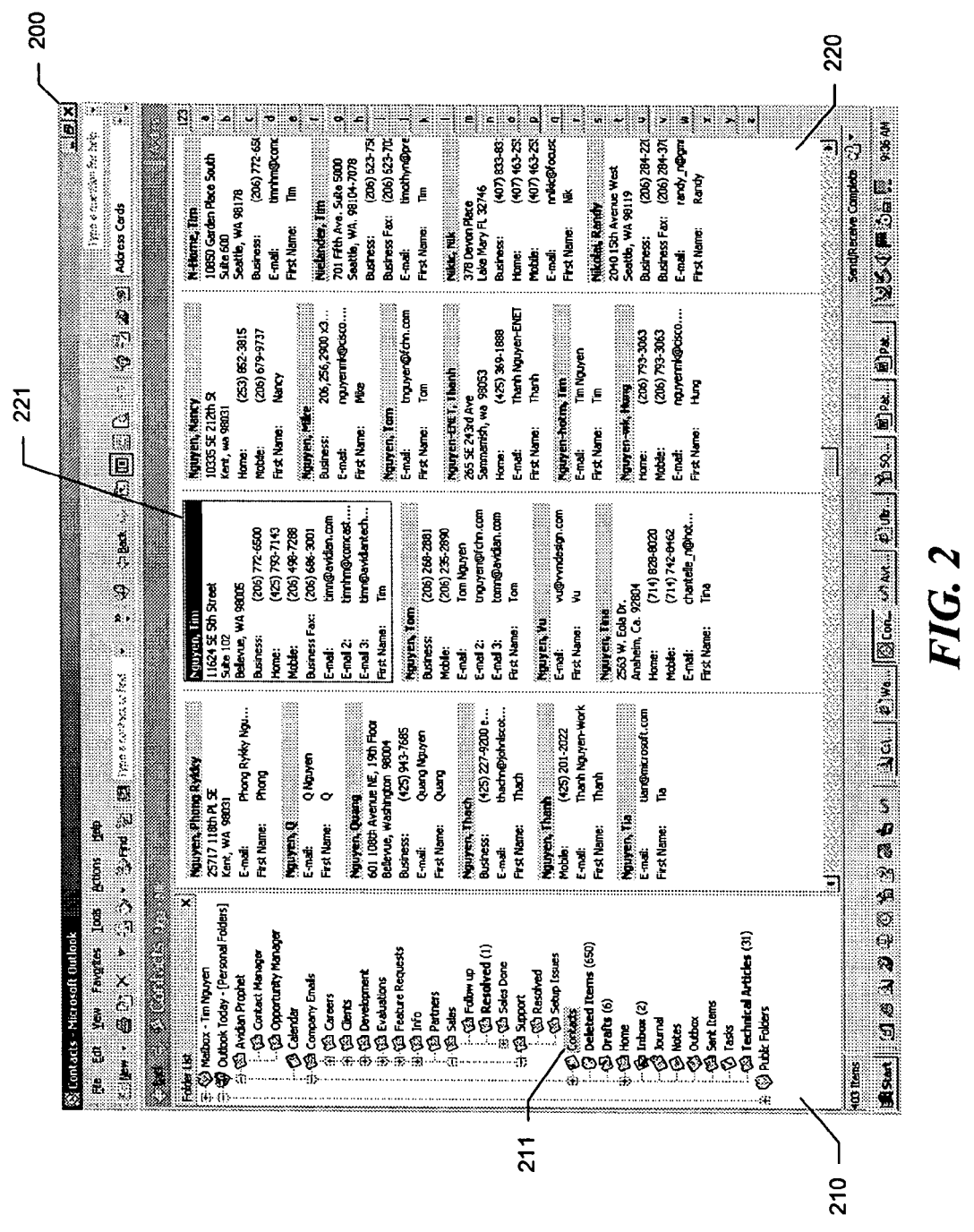

FIG. 2 is a display diagram showing a typical display of contact information in a PIM. It should be noted that, while FIG. 2 and the display diagrams discussed below show the display of particular information in a particular arrangement, various embodiments of the facility may display different information in different arrangements. A display 200 generated by the PIM includes a list 210 of folders containing PIM information items, including such PIM information items as contacts, email messages, appointments, etc. It can be seen that the user has selected a Contacts folder 211 from the folder list. In response, the PIM has displayed in a detail pane 220 some of the contact items that are stored in the selected Contacts folder. These include a "Nguyen, Tim" contact entry 221. Most PIMs generally enable users to create new contacts, modify the information stored in a contact, move a contact from one folder to another, and delete a contact. In the time after a PIM is installed and before the ECM is installed, the user may create any number of contacts in the PIM. After the ECM is installed, the facility begins synchronizing contact information from the PIM to the ECM.

Figure 3:
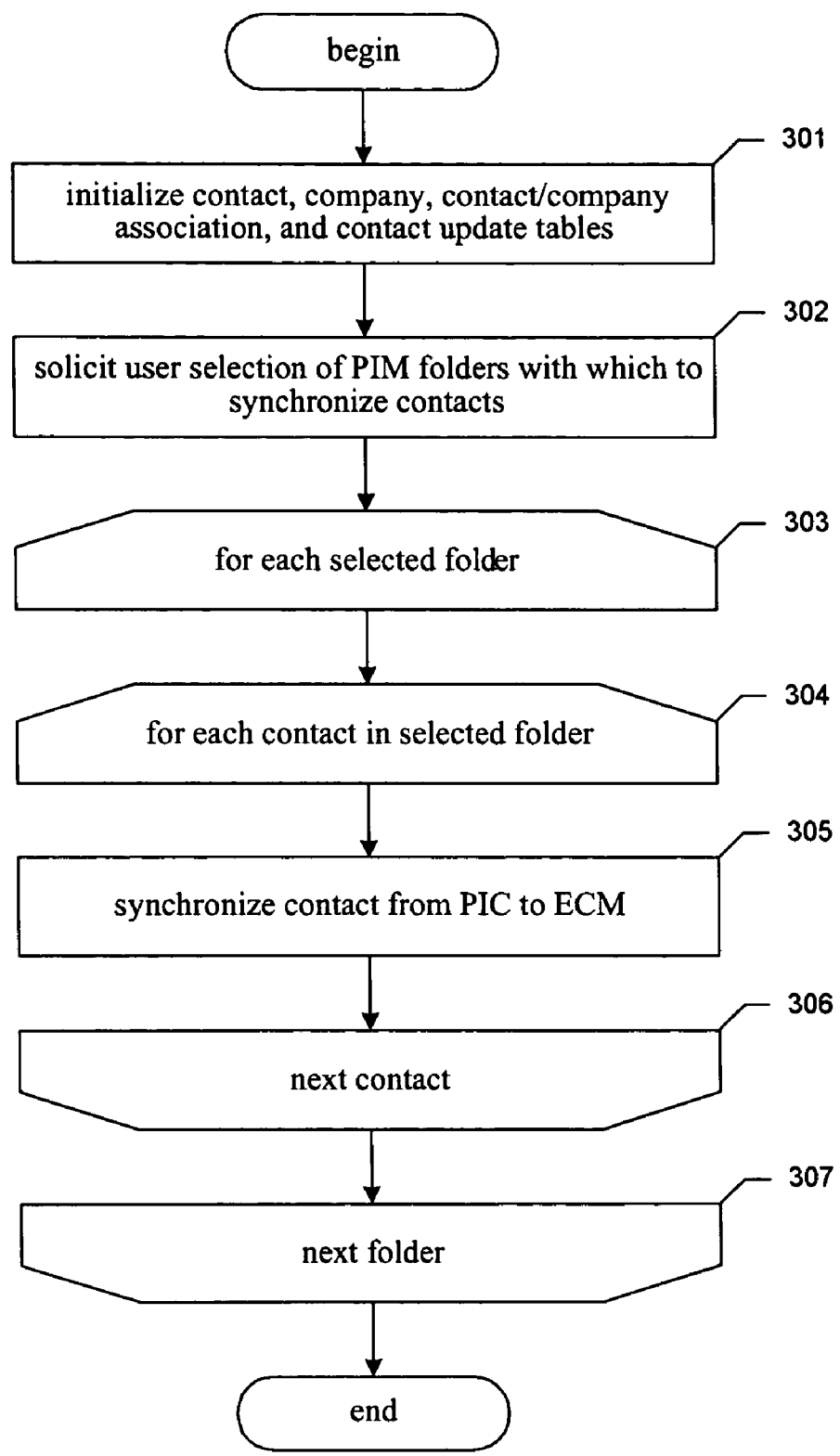
FIG. 3 is a flow diagram showing steps typically performed by the facility in connection with the installation of the ECM.

FIG. 3 is a flow diagram showing steps typically performed by the facility in connection with the installation of the ECM. It should be noted that, while steps are shown in this flow diagram and additional flow diagrams discussed below at a particular level of granularity and in a particular order, various embodiments of the facility may perform the depicted steps differently, such as at a different level of granularity, in a different order, using a proper subset or superset of the shown steps, using parallel processing or event processing techniques not shown, etc.

The steps of FIG. 3 are typically performed in conjunction with installation of the ECM, such as the first time the ECM is executed after being installed. These steps may also be performed at a later time in response to a command from the user to manually resynchronize contacts from the PIM to the ECM. In step 301, the facility initializes the following tables maintained by the ECM: a contact table, a company table, a contact/company association table, and a contact update table. In step 302, the facility solicits a user selection of one or more PIM folders with which to synchronize contacts. Permitting the user to make this selection enables the user to exclude from synchronization contacts not associated with companies, such as personal contacts.

Figure 4:
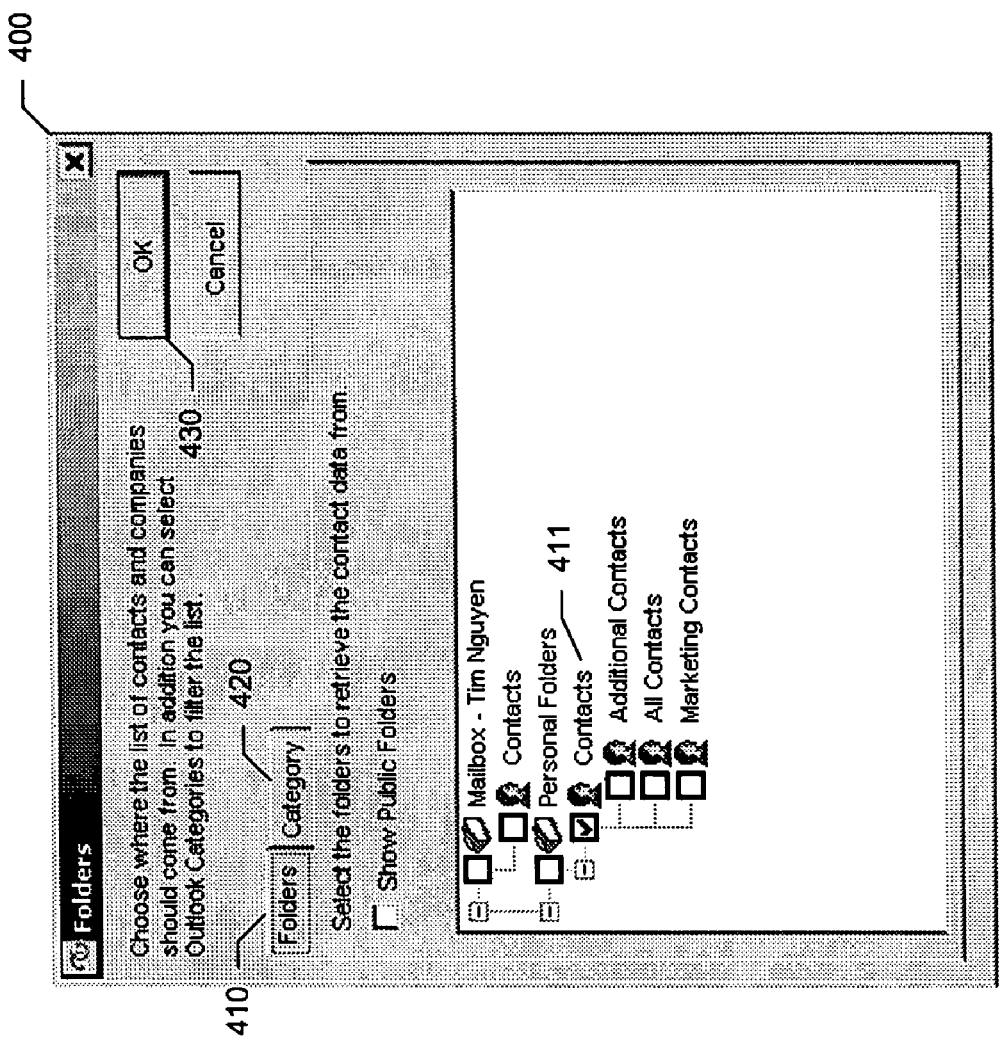
FIG. 4 is a display diagram showing a window typically displayed by the facility to solicit user selection of PIM folders with which to synchronize contacts.

FIG. 4 is a display diagram showing a window typically displayed by the facility to solicit user selection of PIM folders with which to synchronize contacts. The window 400 includes a folders tab 410, in which the user may select folders with which to synchronize contacts, and a category tab 420 that the user may use in order to specify the filtering of synchronized contacts based upon their contact categories. It can be seen in pane 410 that the user has selected a Contacts folder 411 for synchronization. By clicking OK button 430, the user can complete this selection.

Returning to FIG. 3, in steps 303-307, the facility loops through each folder selected by the user in step 302. In steps 304-306, the facility loops through each contact contained in the current selected folder. In step 305, the facility synchronizes the current contact from the PIM to the ECM. Performance of step 305 is discussed in greater detail below in conjunction with FIG. 5. In step 306, if additional contacts remain in the current selected folder, then the facility continues in step 304 to process the next contact, else the facility continues in step 307. In step 307, if additional selected folders remain, then the facility continues in step 303 to process the next selected folder, else these steps conclude.

Figure 5:
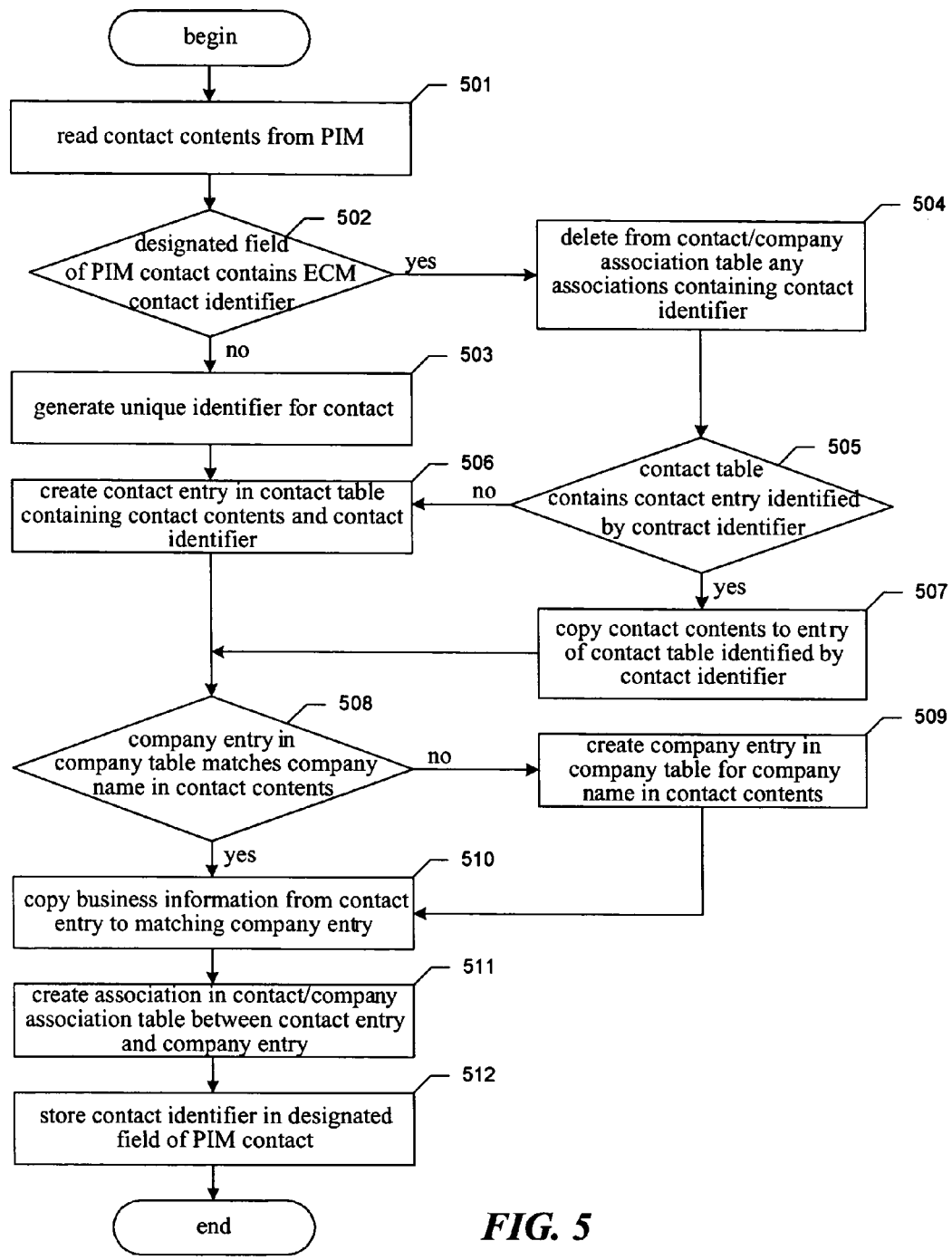
FIG. 5 is a flow diagram showing steps typically performed by the facility to synchronize a contact from the PIM to the ECM.

FIG. 5 is a flow diagram showing steps typically performed by the facility to synchronize a contact from the PIM to the ECM. These steps are typically performed as part of the steps shown in FIG. 3 discussed above, and as part of the steps shown in FIG. 10, discussed below.

In step 501, the facility reads the contents of the contact from the PIM. In some embodiments, the facility accesses information stored by the PIM in a manner that does not cause the display of any security warnings. For example, where the facility operates in conjunction with Outlook, some embodiments of the facility access Outlook data using a third-party data access product called Outlook Redemption version 3.3 by Dimitry Streblechenko, available from http://www.dimastr.com. In step 502, if a field of the PIM contact designated by the facility to contain a contact identifier created by the ECM—such as the mileage field of the PIM contact—contains a contact identifier created by the ECM, then the facility continues in step 504, else the facility continues in step 503. In cases where the ECM is executing for the first time, the facility typically continues in step 503. In step 503, the facility generates an identifier for the contact that is unique across all of the contacts represented by the ECM.

In step 504, the facility deletes from the contact/company association table any associations containing this contact identifier. In step 505, if the contact table contains a contact entry identified by the contact identifier, then the facility continues in step 507, else the facility continues in step 506. In step 506, the facility creates a contact entry in the contact table containing the contact contents read in step 501 and the contact identifier for the contact. After step 506, the facility continues in step 508.

In step 507, the facility copies the contact contents read from the PIM in step 501 to the entry of the contact table identified by the contact identifier. In step 508, if a company entry in the company table matches the company name in the contact contents, then the facility continues in step 510, else the facility continues in step 509. In step 509, the facility creates a company entry in the company table for the company name in the contact contents. After step 509, the facility continues in step 510. In step 510, the facility copies business information from the contact entry to the matching company entry identified in step 508 or created in step 509. In some embodiments, the copied business information includes company name, company address information, company phone numbers and fax numbers, company web site URLs, company email addresses, etc. In step 511, the facility creates an association in the contact/company association table between the contact entry and the company entry. In step 512, the facility stores the contact identifier generated in step 503 in a designated field of the PIM contact, such as the mileage field of the PIM contact. In some embodiments, the facility performs step 512 by setting a mileage property of the PIM contact to the generated contact identifier, then saving and closing the PIM contact. After step 512, these steps conclude. In some embodiments (not shown), the facility further synchronizes from the PIM to the ECM a user-modifiable list of contact categories used to categorize each contact, so that this additional information is available in conjunction with the synchronized contacts. In some embodiments (not shown), if the contact entry contains a company name, but not a contact name, the facility (a) creates a new company entry if one does not yet exist for this company name; (b) does not create a contact entry; and (c) does not create a contact/company association.

Figure 6:
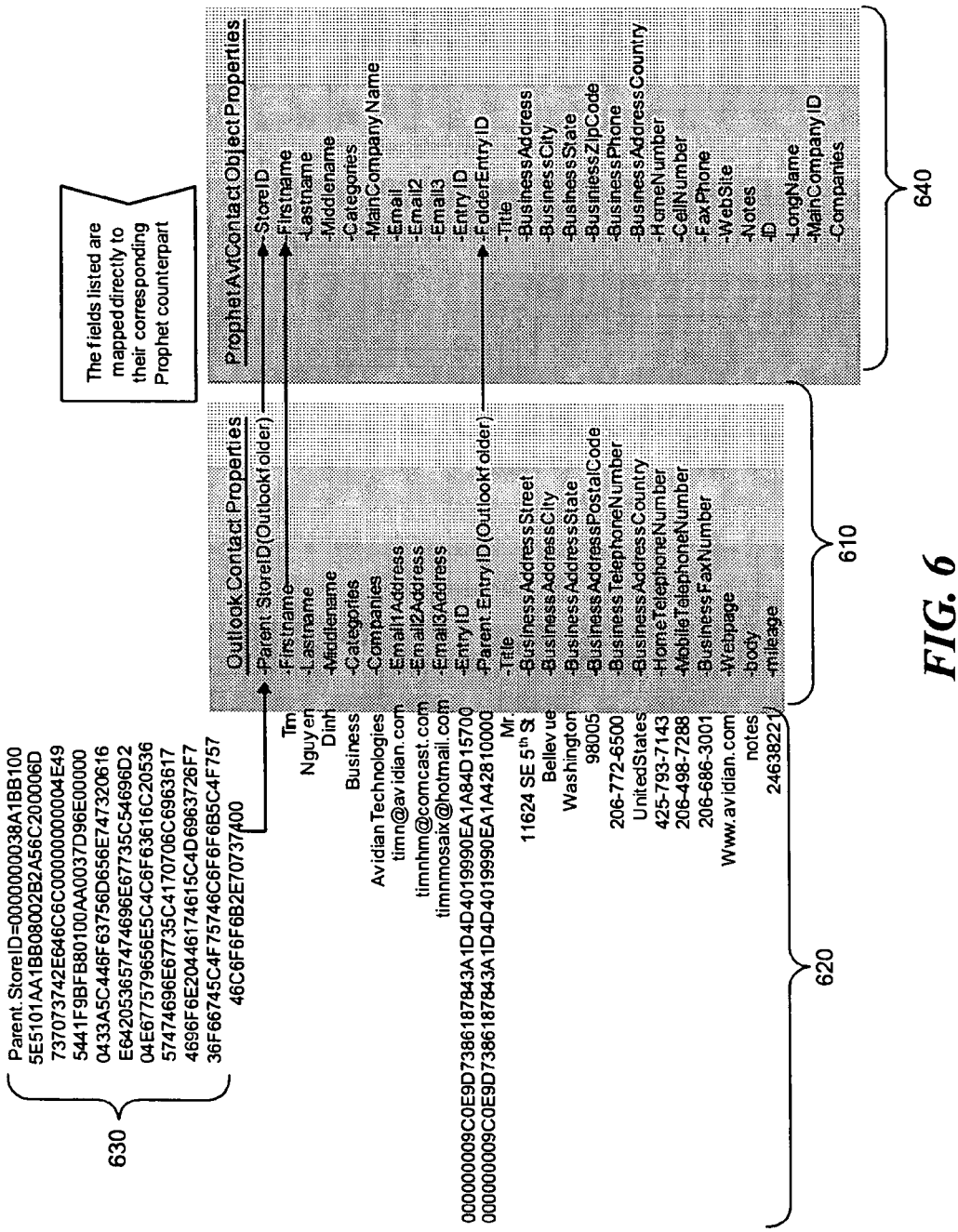
FIG. 6 is a data structure diagram showing the contents of a sample contact entry, as represented both in the PIM and in the ECM.

FIG. 6 is a data structure diagram showing the contents of a sample contact entry, as represented both in the PIM and in the ECM. It should be noted that, while FIG. 6 and additional data structure diagrams discussed below show the storage of a particular body of data in a particular form, various embodiments of the facility may store data differently, such as in a different order; in a different format; using various forms of compression, encryption, and indexing; in one or more data structures of different types; or in a proper subset or superset of the data shown. The diagram shows a list 610 of the fields (or "properties") of the PIM entry, and their contents 620. Data block 630 shows the raw internal representation of these contents. The list 640 shows the fields of the ECM contact entry, into which the contents of the PIM contact entry are copied during synchronization.

Figure 7:
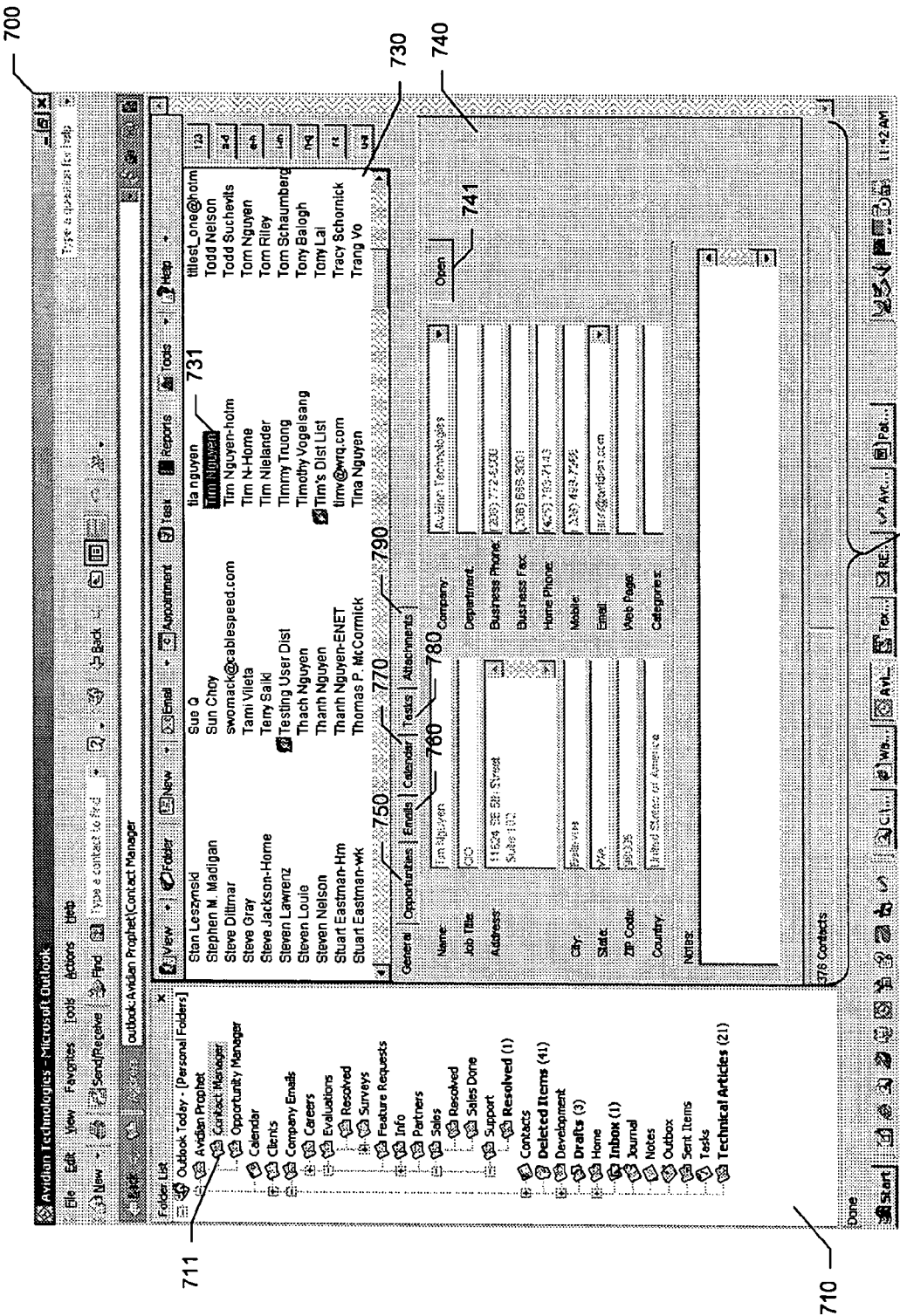
FIG. 7 is a display diagram showing a typical display generated by the ECM for reviewing its synchronized contact information.

FIG. 7 is a display diagram showing a typical display generated by the ECM for reviewing its synchronized contact information. The display 700 is generated by the PIM, while pane 720 within the display is generated by the ECM. The display includes a list 710 of PIM folders, including a selected ECM folder 711. With ECM folder 711 selected, the PIM delegates to the ECM the responsibility for generating the display within pane 720. The display within pane 720 includes a list 730 of contacts synchronized from the PIM to the ECM, of which contact 731 is selected. In response to selection of contact 731, the ECM displays contact contents 740, which includes the contents of the fields maintained for the contact by the ECM. If the user wishes to change any of these contacts, the user can click Open button 741. This has the effect of causing the PIM to open an editing window for the corresponding PIM contact. The user may use that window to modify the contents of the PIM contact. The facility then re-synchronizes this modified PIM contact into the ECM. By requiring that the user make any changes to the contact information in the PIM, the facility ensures that the PIM contains the authoritative version of contact information, and obviates any need to synchronize contact data from the ECM to the PIM. The user may also click on the following additional tabs: an Opportunities tab 750 showing sales opportunities associated with this contact; an Emails tab 760 for showing emails associated with this contact; a Calendar tab 770 for showing calendar appointments associated with this contact; a Tasks tab 780 for showing tasks associated with this contact; and an Attachments tab 790 for showing attachments to email messages, calendar items, task items, and contact items associated with this contact.

In some embodiments, the facility automatically performs resynchronization of particular contacts when they are created or changed in the PIM. This is discussed further below in conjunction with FIGS. 8-10.

Figure 8:
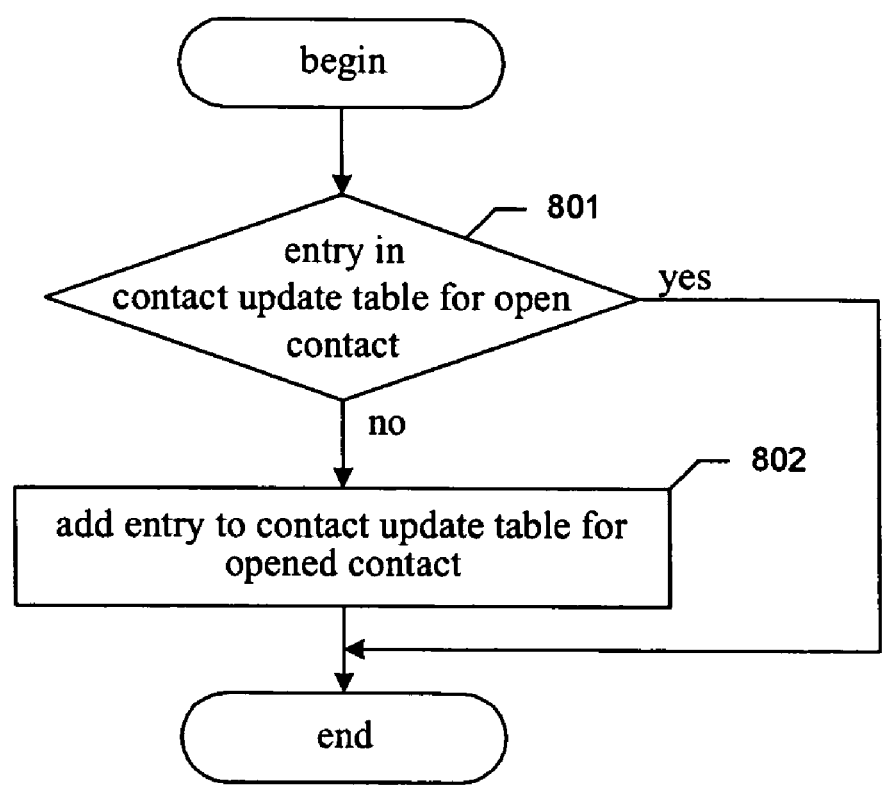
FIG. 8 is a flow diagram showing steps typically performed when a user opens a window for creating a new contact or editing an existing contact in the PIM.

FIG. 8 is a flow diagram showing steps typically performed when a user opens a window for creating a new contact or editing an existing contact in the PIM. These steps are typically performed in response to receiving a notification from the PIM that the user has opened a window for creating a new contact or editing an existing contact. For example, when the facility is used in conjunction with Outlook, the facility registers to receive Inspectors NewInspector events, notifying that the user has opened a window for creating a new contact or editing an existing contact. In step 801, if the contact update table already contains an entry for the contact that was opened, then these steps conclude, else the facility continues in step 802. In step 802, because the contact update table does not yet contain an entry for the open contact, the facility adds an entry to the contact update table for the opened contact, so that the facility automatically re-synchronizes the opened contact the next time the ECM is invoked. The details of step 802 are discussed in greater detail below in conjunction with FIG. 9. After step 802, these steps conclude.

Figure 9:
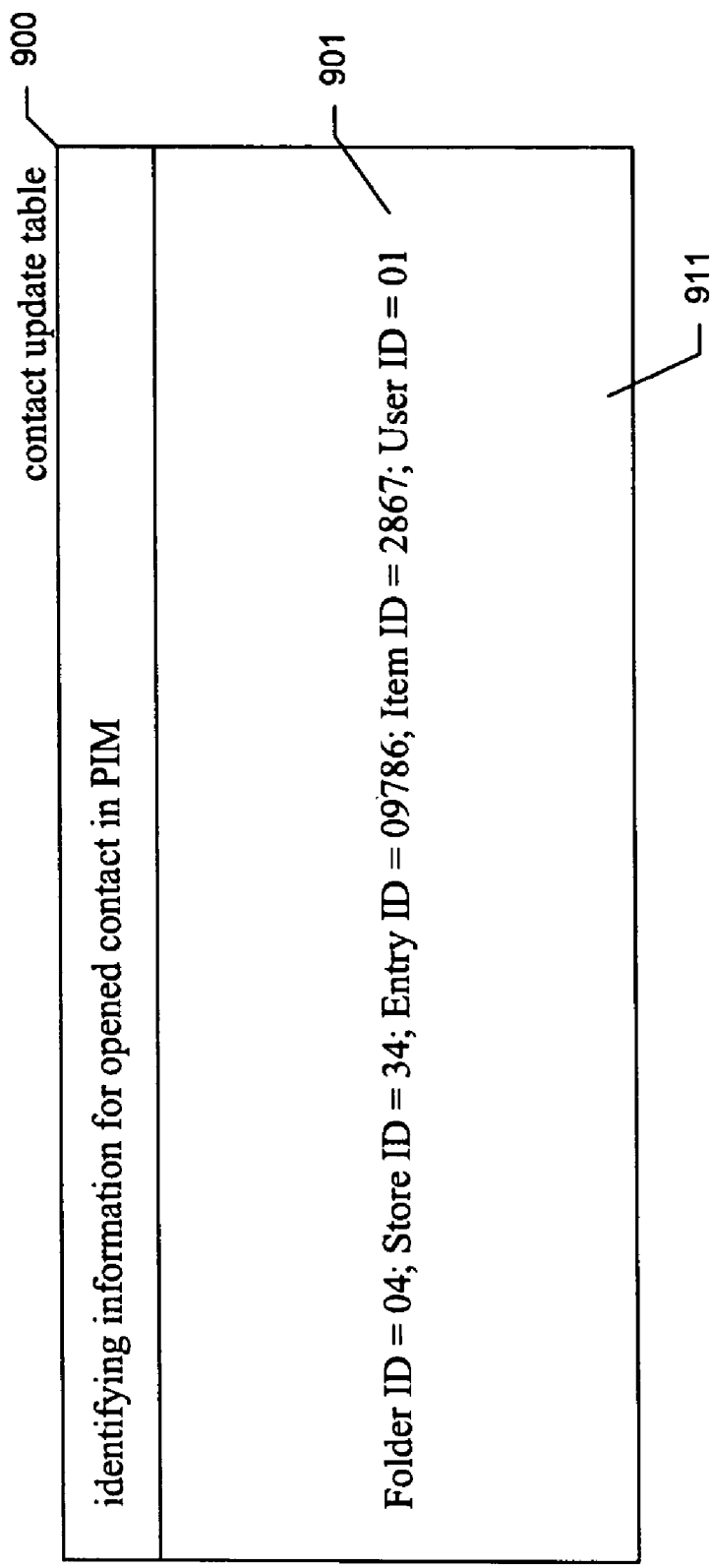
FIG. 9 is a data structure diagram showing typical contents of the contact update table.

FIG. 9 is a data structure diagram showing typical contents of the contact update table. The contact update table contains an entry for each contact that has been opened for editing in the PIM. The contact update table 900 is made up of rows, such as row 901, each containing a single entry. The table is divided into a single column 911 containing information used by the PIM to identify the open contact that may be used by the facility to synchronize the open contact. In row 901, this information includes a FolderID of "04," a StoreID of "34," and EntryID of "09786," and ItemID of "2867," and a UserID of "01."

Figure 10:
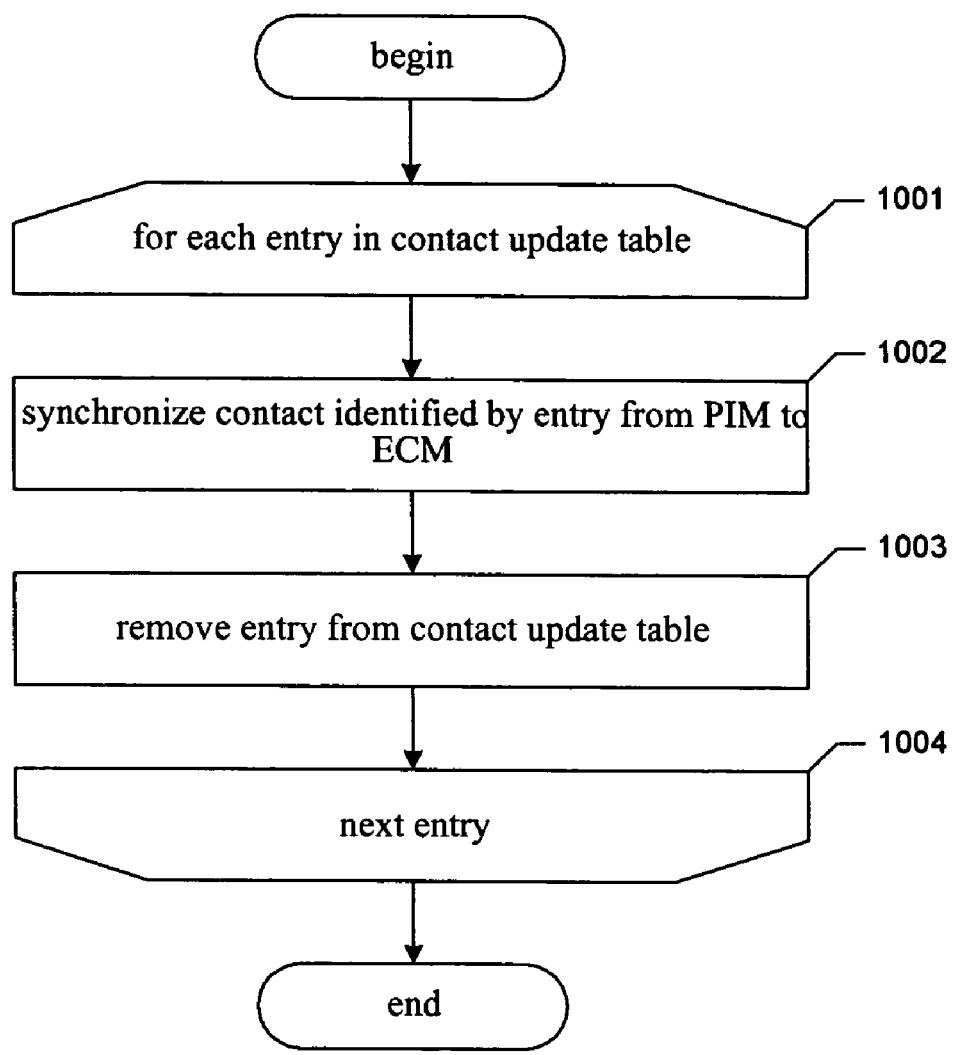
FIG. 10 is a flow diagram showing steps typically performed by the facility when the ECM is activated to display information within the PIM.

FIG. 10 is a flow diagram showing steps typically performed by the facility when the ECM is activated to display information within the PIM. In steps 1001-1004, the facility loops through each entry in the contact update table. Each such entry corresponds to a contact that was opened for editing in the PIM since the last time the facility performed the steps shown in FIG. 10. In step 1002, the facility synchronizes from the PIM to the ECM the contact identified by the current entry of the contact update table using steps such as the steps shown in FIG. 5. In step 1003, the facility removes the current entry from the contact update table. In step 1004, if additional entries remain in the contact update table, the facility continues in step 1001 to process the next entry, else these steps conclude.

Figure 11:
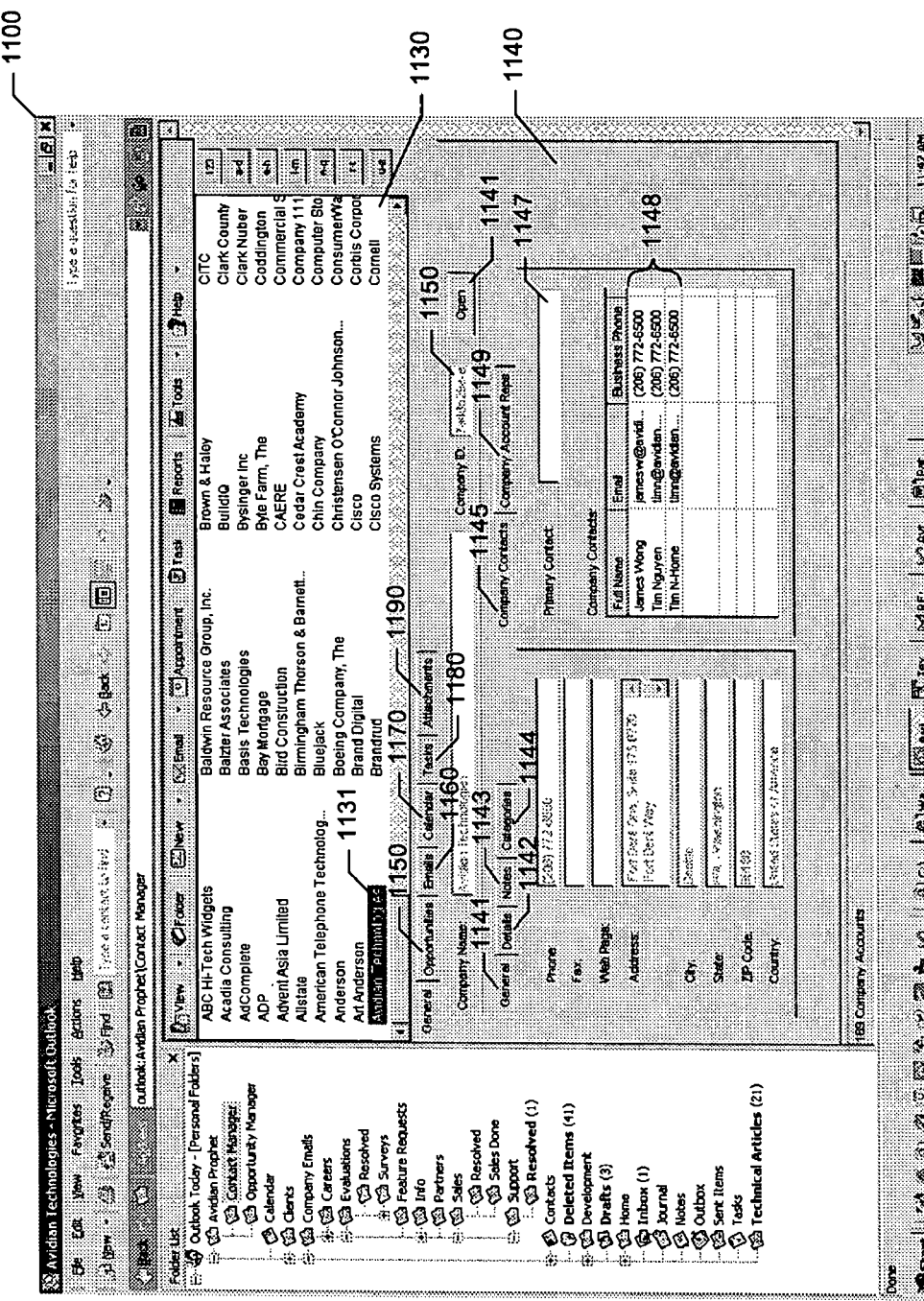
FIG. 11 is a display diagram showing a display by the facility of a company entry.

In some embodiments, the facility enables the user to display and modify company entries created by the PIM and information associated therewith. FIG. 11 is a display diagram showing a display by the facility of a company entry. In the display 1100, an "Avidian Technologies" company 1131 is selected from a list 1130 of companies created by the facility. A pane 1140 contains information about the company, including General information 1140, Details 1142, Notes 1143, and Categories 1144. The pane also includes Company Contact information 1145 identifying contacts that are associated with this company. The company contact information includes a list 1148 of contacts associated with the company, as well as information 1147 identifying a primary contact for this company. The pane also includes information 1149 about Company Account Representatives assigned to support the company; the company's identifier 1150; opportunities 1150 associated with the company; Emails 1160 associated with the company; Calendar appointments 1170 associated with the company; Tasks 1180 associated with the company; and Attachments 1190 to email messages, calendar items, task items, and contact items associated with the company. The pane further includes an open button 1141 that the user may click in order to open the company entry for editing.

Figure 12:
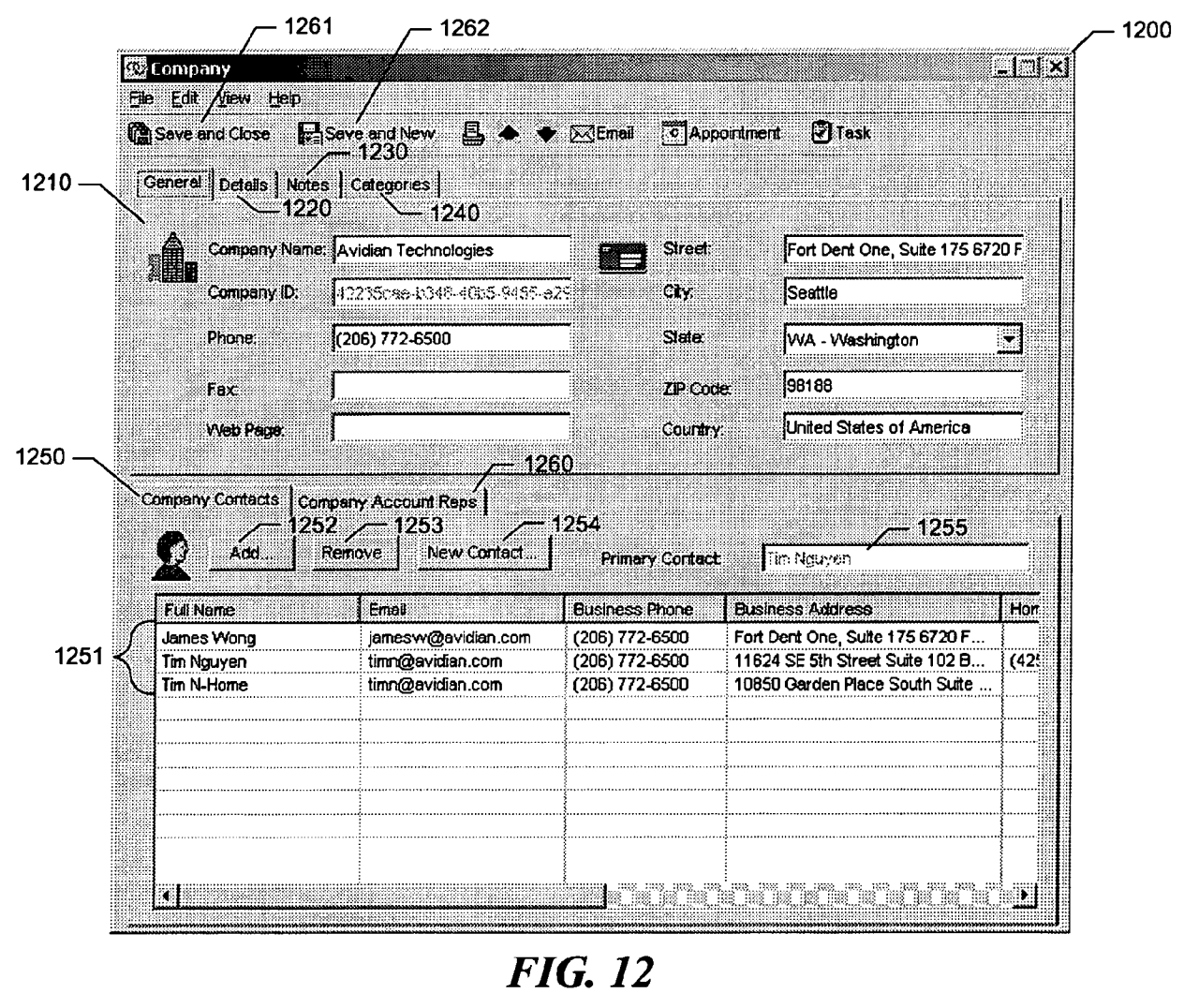

FIG. 12 is a display diagram showing the facility displaying additional information about a company entry, and enabling a user to modify that company entry. The display shown in FIG. 12 may be displayed by clicking open button 1141 shown in FIG. 11. The display 1200 includes the following information about the company that can be edited by the user: General information 1210; Details 1220; Notes 1230; and Categories 1240. The display also includes information 1250 about contacts that are associated with the company, including a list 1251 of associated contacts; an Add button 1252 for associating an additional user with the company; a Remove button 1253 for disassociating one or more contacts from the company; and a New Contact button 1254 for creating a new contact that will be associated with the company. The company information further includes an indication 1255 of the primary contact for the company, and information 1260 about account representatives assigned to this company. After editing the information in the display, the user may click a Save and Close button 1261 to store in the company table the revised company information, or may click a Save and New button 1262 to store in the company table the revised company information and clear the fields of the display 1200 to enable the user to input information defining a new company item.

FIGS. 13-15 show sample contents of tables maintained by the facility. FIG. 13 is a data structure diagram showing partial sample contents of the contact table maintained by the facility. The contact table 1300 contains rows, such as row 1301-1303, of contacts synchronized from the PIM to the ECM. Each row is divided into columns including a contact identifier column 1311 containing an identifier assigned by the ECM to identify the contact; a first name column 1312 containing the contact's first name; a last name column 1313, containing the contact's last name; and additional columns 1314 containing additional contact information. For example, it can be seen from row 1302 of the contact table that a contact having first name "Tim" and last name "Nguyen" has contact identifier "24638221".

FIG. 14 is a data structure diagram showing partial sample contents of the company table maintained by the facility. The company table 1400 is made up of rows, such as row 1401, each corresponding to a company established by the ECM. Each row is divided into a number of columns, including: a company identifier column 1411, containing an identifier assigned by the ECM to identify the company; a company name column 1412, containing the company's name; and additional columns 1413, containing additional company information. For example, it can be seen from row 1401 that a company whose name is "Avidian Technologies" has company identifier "7a46a29a-e".

FIG. 15 is a data structure diagram showing partial sample contents of the contact/company association table maintained by the facility. The contact/company association table 1500 is made up of rows each corresponding to an association between a single contact and a single company. Each row is divided into a contact identifier column 1511 identifying the associated contact, and a company identifier column 1512 identifying the associated company. For example, it can be seen from row 1502 that the "Nguyen, Tim" contact having contact identifier "24638221" is associated with the "Avidian Technologies" company having company identifier "7a46a29a-e".

It will be appreciated by those skilled in the art that the above-described facility may be straightforwardly adapted or extended in various ways. For example, the facility may operate in conjunction with a variety of different PIMs, which maintain data structures of different types, use different displaying conventions, use different mechanisms to facilitate and communicate with add-in programs, etc. Portions of the facility may be used without using others. While the foregoing description makes reference to preferred embodiments, the scope of the invention is defined solely by the claims that follow and the elements recited therein.

We claim:

1. A method in a computing system for enhancing the information available for contact entries stored by a personal information manager, comprising:

after installing the personal information manager, installing an enhanced contact manager program as an add-in module to the personal information manager;

the first time the enhanced contact manager is executed after the enhanced contact manager is installed, under the control of the enhanced contact manager:

automatically selecting a primary personal information manager folder containing contact entries;

for each contact entry contained by the selected primary personal information manager folder:

creating a contact entry in a contact database table managed by the enhanced contact manager that contains the contents of the contact entry contained by the selected personal information manager folder, the created contact entry containing a unique contact identifier;

storing the contact identifier contained by the created contact entry in a mileage field of the contact entry contained by the selected personal information manager folder;

for each contact entry created in the contact database table:

determining whether a company database table managed by the enhanced contact manager contains a company entry whose company name field contents match the contents of the company name field of the contact entry;

if the company database table does not contain a company entry whose company name field contents match the contents of the company name field of the contact entry, creating a company entry whose company name field contents match the contents of the company name field of the contact entry, the created company entry containing a unique company identifier;

determining whether an association exists between the contact identifier of the contact entry and the company identifier of the matching company entry;

if an association does not exist between the contact identifier of the contact entry and the company identifier of the matching company entry, between the contact identifier of the contact entry and the company identifier of the matching company entry copying the contents of business fields of the contact entry to fields of the matching company entry;

registering the enhanced contact manager to be notified each time a contact entry is opened in the personal information manager;

each time the enhanced contact manager is notified that a contact entry is opened in the personal information manager, if a contact update database table managed by the enhanced contact manager does not contain a contact update entry that identifies the opened contact entry in the personal information manager, creating a contact update entry in the update database table that identifies the opened contact entry in the personal information manager;

each time the enhanced contact manager is displayed within the personal information manager, for each contact update entry in the contact update table:

if the mileage field of the contact entry in the personal information manager contains a contact identifier, deleting any associations that exist between the contact company identifiers and the contact identifier contained by the mileage field of the contact entry in the personal information manager;

if the contact table does not contain a contact entry that contains the contact identifier contained by the mileage field of the contact entry and the personal information manager, creating a contact entry in a contact table that contains the contact identifier contained by the mileage field of the contact entry in the personal information manager;

copying the contents of the contact entry in the personal information manager to the contact entry in the contact table contained the contact identifier contained by the mileage field of the contact entry in the personal information manager;

storing the contact identifier contained by the created contact entry in a mileage field of the contact entry of the contact entry in the personal information manager;

determining whether the company table contains a company entry whose company name field contents match the contents of the company name field of the contact entry;

if the company database table does not contain a company entry whose company name field contents match the contents of the company name field of the contact entry, creating a company entry whose company name field contents match the contents of the company name field of the contact entry, the created company entry containing a unique company identifier;

determining whether an association exists between the contact identifier of the contact entry and the company identifier of the matching company entry;

if an association does not exist between the contact identifier of the contact entry and the company identifier of the matching company entry, between the contact identifier of the contact entry and the company identifier of the matching company entry copying the contents of business fields of the contact entry to fields of the matching company entry;

in response to user input, displaying a list of company entries in the company table; and in response to user input selecting one of the displayed company entries, displaying a list of contacts associated with the selected company entry.

2. The method of claim 1 wherein the personal information manager notifies the add-in that a contact entry is opened in the personal information manager via an Inspectors.NewInspector event.

3. A computer-readable medium whose contents cause a computing system to perform a method for enhancing the information available for contact entries stored by a personal information manager, the method comprising:

after installing the personal information manager, installing an enhanced contact manager program as an add-in module to the personal information manager;

the first time the enhanced contact manager is executed after the enhanced contact manager is installed, under the control of the enhanced contact manager:

automatically selecting a primary personal information manager folder containing contact entries;

for each contact entry contained by the selected primary personal information manager folder:

creating a contact entry in a contact database table managed by the enhanced contact manager that contains the contents of the contact entry contained by the selected personal information manager folder, the created contact entry containing a unique contact identifier;

storing the contact identifier contained by the created contact entry in a mileage field of the contact entry contained by the selected personal information manager folder;

for each contact entry created in the contact database table:

determining whether a company database table managed by the enhanced contact manager contains a company entry whose company name field contents match the contents of the company name field of the contact entry;

if the company database table does not contain a company entry whose company name field contents match the contents of the company name field of the contact entry, creating a company entry whose company name field contents match the contents of the company name field of the contact entry, the created company entry containing a unique company identifier;

determining whether an association exists between the contact identifier of the contact entry and the company identifier of the matching company entry;

if an association does not exist between the contact identifier of the contact entry and the company identifier of the matching company entry, between the contact identifier of the contact entry and the company identifier of the matching company entry copying the contents of business fields of the contact entry to fields of the matching company entry;

registering the enhanced contact manager to be notified each time a contact entry is opened in the personal information manager;

each time the enhanced contact manager is notified that a contact entry is opened in the personal information manager, if a contact update database table managed by the enhanced contact manager does not contain a contact update entry that identifies the opened contact entry in the personal information manager, creating a contact update entry in the update database table that identifies the opened contact entry in the personal information manager;

each time the enhanced contact manager is displayed within the personal information manager, for each contact update entry in the contact update table:

if the mileage field of the contact entry in the personal information manager contains a contact identifier, deleting any associations that exist between the contact company identifiers and the contact identifier contained by the mileage field of the contact entry in the personal information manager;

if the contact table does not contain a contact entry that contains the contact identifier contained by the mileage field of the contact entry and the personal information manager, creating a contact entry in a contact table that contains the contact identifier contained by the mileage field of the contact entry in the personal information manager;

copying the contents of the contact entry in the personal information manager to the contact entry in the contact table contained the contact identifier contained by the mileage field of the contact entry in the personal information manager;

storing the contact identifier contained by the created contact entry in a mileage field of the contact entry of the contact entry in the personal information manager;

determining whether the company table contains a company entry whose company name field contents match the contents of the company name field of the contact entry;

if the company database table does not contain a company entry whose company name field contents match the contents of the company name field of the contact entry, creating a company entry whose company name field contents match the contents of the company name field of the contact entry, the created company entry containing a unique company identifier;

determining whether an association exists between the contact identifier of the contact entry and the company identifier of the matching company entry;

if an association does not exist between the contact identifier of the contact entry and the company identifier of the matching company entry, between the contact identifier of the contact entry and the company identifier of the matching company entry copying the contents of business fields of the contact entry to fields of the matching company entry;

in response to user input, displaying a list of company entries in the company table; and in response to user input selecting one of the displayed company entries, displaying a list of contacts associated with the selected company entry.

4. The computer-readable medium of claim 3 wherein the personal information manager notifies the add-in that a contact entry is opened in the personal information manager via an Inspectors.NewInspector event.

* * * * *